US011119774B2

(12) United States Patent
Thompto et al.

(10) Patent No.: US 11,119,774 B2
(45) Date of Patent: Sep. 14, 2021

(54) SLICE-TARGET REGISTER FILE FOR MICROPROCESSOR

(71) Applicant: International Business Machines Corporation, Armonk, NY (US)

(72) Inventors: Brian W. Thompto, Austin, TX (US); Dung Q. Nguyen, Austin, TX (US); Hung Q. Le, Austin, TX (US); Sam Gat-Shang Chu, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 16/562,934

(22) Filed: Sep. 6, 2019

(65) Prior Publication Data
US 2021/0072992 A1    Mar. 11, 2021

(51) Int. Cl.
*G06F 9/30*    (2018.01)

(52) U.S. Cl.
CPC ...... *G06F 9/30141* (2013.01); *G06F 9/30043* (2013.01)

(58) Field of Classification Search
CPC .......................... G06F 9/30043; G06F 9/30141
See application file for complete search history.

(56) References Cited

U.S. PATENT DOCUMENTS

| | | |
|---|---|---|
| 4,594,660 A | 6/1986 | Guenthner et al. |
| 6,237,076 B1 | 5/2001 | Gaertner et al. |
| 6,366,998 B1 | 4/2002 | Mohamed |
| 6,711,602 B1 | 3/2004 | Bhandal et al. |
| 6,874,079 B2 | 3/2005 | Hogenauer |
| 7,334,201 B1 | 2/2008 | Sanghavi et al. |
| 8,046,566 B2 | 10/2011 | Abernathy et al. |
| 8,069,290 B2 | 11/2011 | Conti et al. |
| 8,261,046 B2 | 9/2012 | Gibert et al. |
| 8,412,761 B2 | 4/2013 | Yoshida |
| 9,207,995 B2 | 12/2015 | Boersma et al. |
| 9,323,528 B2 | 4/2016 | Sasanka |
| 9,690,586 B2 | 6/2017 | Eisen et al. |

(Continued)

OTHER PUBLICATIONS

Anonymously; "Method to reduce the area and increase the speed of a highly ported register file" Nov. 13, 2002, htpp://ip.com/IPCOM/000010255D, pp. 1-8.

(Continued)

*Primary Examiner* — Zachary K Huson
(74) *Attorney, Agent, or Firm* — Scully, Scott, Murphy & Presser, P.C.

(57) ABSTRACT

A system and/or method for processing information is disclosed that has at least one processor; a register file associated with the processor, the register file sliced into a plurality of STF blocks having a plurality of STF entries, and in an embodiment, each STF block is further partitioned into a plurality of sub-blocks, each sub-block having a different portion of the plurality of STF entries; and a plurality of execution units configured to read data from and write data to the register file, where the plurality of execution units are arranged in one or more execution slices. In one or more embodiments, the system is configured so that each execution slice has a plurality of STF blocks, and alternatively or additionally, each of the plurality of execution units in a single execution slice is assigned to write to one, and preferably only one, of the plurality of STF blocks.

20 Claims, 5 Drawing Sheets

(56) References Cited

U.S. PATENT DOCUMENTS

| | | | |
|---|---|---|---|
| 9,720,696 | B2 | 8/2017 | Chu et al. |
| 9,804,851 | B2 | 10/2017 | Grisenthwaite et al. |
| 9,870,045 | B2 | 1/2018 | Battle et al. |
| 10,282,206 | B1* | 5/2019 | Sun ................... G06F 9/30098 |
| 2007/0239970 | A1 | 10/2007 | Liao et al. |
| 2008/0313424 | A1 | 12/2008 | Gschwind |
| 2009/0198966 | A1 | 8/2009 | Gschwind et al. |
| 2013/0246761 | A1 | 9/2013 | Derby et al. |
| 2015/0006855 | A1 | 1/2015 | Gschwind et al. |
| 2015/0121047 | A1 | 4/2015 | Bradbury et al. |
| 2016/0070574 | A1 | 3/2016 | Boersma et al. |
| 2016/0092231 | A1* | 3/2016 | Chu ...................... G06F 9/3851 712/214 |
| 2016/0357566 | A1 | 12/2016 | Bowman et al. |
| 2017/0109093 | A1 | 4/2017 | Chu et al. |
| 2017/0109171 | A1* | 4/2017 | Eisen ................. G06F 12/0891 |
| 2018/0225124 | A1* | 8/2018 | Gupta ................. G06F 9/30076 |

OTHER PUBLICATIONS

IBM; "A method of register renaming for a merged register file sharing different data types", Feb. 4, 2008, htpp://ip.com/IPCOM/000167251D, pp. 1-4.

Anonymously, "Control for activation of reduced leakage mode in write circuitry of SRAM arrays and register files", Apr. 25, 2012, htpp://ip.com/IPCOM/00216955D, pp. 1-4.

Zilles C. et al., "Execution-based Prediction Using Speculative Slices", 28th Annual International Symposium on Computer Architectures (ISCA2001) Jul. 2001, pp. 1-12.

Collins, JD. et al., "Dynamic Speculative Precomputation", In Proceedings of the 34th International Symposium on Mircroarchitecture, Dec. 2001, pp. 1-12.

Anne Bracy, Prashant Prahlad, and Amir Roth, "Dataflow minigraphs: Amplifying superscalar capacity and bandwidth," In Microarchitecture, 2004. MICRO-37 2004. 37th International Symposium on, pp. 18-29. IEEE, 2004.

Stephan Wong, Fakhar Anjam, Faisal Nadeem, "Dynamically reconfigurable register file for a softcore VLIW processor," Date '10 2010, Proceedings of the Conference on Design, Automation and Test in Europe, pp. 969-972.

John Kloosterman, Jonathan Beaumont, D. Anoushe Jamshidi, Jonathan Bailey, Trevor Mudge, and Scott Mahlke, "Regless: just-in-time operand staging for GPUs," Oct. 2017 MICRO-50 '17: Proceedings of the 50th Annual IEEE/ACM International Symposium on Microarchitecture, pp. 151-164.

Athanasaki, E. et al., "Exploring the Performance Limits of Simultaneous Multithreading for Memory Intensive Applications", Springer Science+Business Media, LLC, 2007, pp. 1-34.

IBM, "Method of Saving Power in a Register File Supporting Multiple SMT Modes Using a Free List Stack to Manage Allocation/Deallocation of the Register File Pointers", Feb. 5, 2008, htpp://ip.com/IPCOM000167259D, pp. 1-4.

Anonymously, "System and Method for Achieving Out-of-Order Execution of Instructions in Simultaneous Multithreaded (SMT) Processor Cores", Sep. 20, 2010, htpp://ip.com/IPCOM000199883D, pp. 1-6.

Anonymously, "Method and System for Implementing "Register Threads" in a Simultaneously-Multithreaded (SMT) Processor Core", Sep. 17, 2010, htpp://ip.com/IPCOM000199825D, pp. 1-5.

List of IBM Patents or Patent Applications Treated As Related, Nov. 23, 2019, pp. 2.

IBM, "POWER8 Processor User's Manual for the Single-Chip Module", International Business Machines Corporation, Mar. 16, 2016, pp. 31-35, 135, 149, 266-268 and 449-450.

Sinharoy, B., et al., "IBM POWER8 processor core Microarchitecture", International Business Machines Corporation, Jan./Feb. 2015, 21 pages, vol. 59, No. 1.

Office Action dated Nov. 25, 2020 received in U.S. Appl. No. 16/563,091, copy not enclosed.

Office Action dated Dec. 21, 2020 received in U.S. Appl. No. 16/563,015, copy not enclosed.

* cited by examiner

SLICE-TARGET REGISTER FILE FOR MICROPROCESSOR

BACKGROUND OF INVENTION

The present invention generally relates to data processing systems, processors, and more specifically to register files in processors, including out-of-order execution processors.

Processors currently used in data processing systems process more than one instruction at a time, and often process those instructions out-of-order. In modern computer architecture, there are several known ways to design a computer adapted to perform more than one instruction at a time, or at least in the same time frame. For example, such a computer may include more than one processor core (i.e., central processing unit) and each processor core may be capable of acting independently of other processor cores. This may allow for true multitasking, with each processor core processing a different instruction stream in parallel with the other processor cores of the computer.

Another design to improve throughput includes multiple execution slices within a processor core to process multiple instruction threads at the same time, with the threads sharing certain resources of the processor core. An execution slice may be a pipeline or pipeline-like structure where multiple data processing hardware units are connected in series to process multiple instructions in a single processing cycle. Pipelining involves processing instructions in stages, so that the pipelined stages may process a number of instructions concurrently. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

SUMMARY

The summary of the disclosure is given to aid understanding of a computer system, computer architectural structure, processor, register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

A computer system for processing information is disclosed where the computer system includes at least one processor; a register file associated with the at least one processor, the register file sliced into a plurality of STF blocks having a plurality of STF entries, wherein each STF block has one or more write ports for writing data to that STF block and a plurality of read ports for reading data from that STF block, and wherein each STF block is further partitioned into a plurality of sub-blocks, each sub-block having a different portion of the plurality of STF entries for storing data; and a plurality of execution units associated with the register file and configured to read data from and write data to the register file, where the plurality of execution units are arranged and configured in an execution slice, and the execution slice has a plurality of STF blocks. The system in one or more embodiments is configured so that each of the plurality of execution units in the execution slice is assigned to write to only one of the plurality of STF blocks. In a further aspect each of the plurality of execution units in the execution slice is assigned to write data to only one of the plurality of sub-blocks of one of the plurality of STF blocks of the register file. In an embodiment the computer system further has a mapper for mapping logical register entries to one sub-block of the plurality of sub-blocks based upon the execution unit. Each STF block in an aspect is configured to have only one write port.

In one or more aspects a first execution slice has a first multiplexor to receive up to three operands read from the plurality of STF blocks in the first execution slice and has a second multiplexor to receive up to two operands read from the plurality of STF blocks in the first execution slice, and a second execution slice has a first multiplexor to receive up to three operands read from the plurality of STF blocks in the second execution slice and has a second multiplexor to receive up to two operands read from the plurality of STF blocks in the second execution slice, and wherein the output of the first multiplexor in the first execution slice is configured as one of the inputs to the first multiplexor of the second execution slice. In an embodiment, the STF entries are "N" bits or less in width, and the processor is configured and adapted to handle operations greater than "N" bits by muxing the STF entry from the first execution slice onto the STF entry from the second execution slice.

A computer system for processing information is disclosed having at least one processor; a register file associated with the at least one processor, the register file having a plurality of STF blocks having a plurality of STF entries for storing data, wherein each STF block has one or more write ports to write data to the STF block and multiple ports to read data from the STF block, and wherein each STF block is further partitioned into a plurality of sub-blocks, each sub-block having a different portion of the plurality of STF entries for storing data; and a plurality of execution units associated with the register file wherein the plurality of execution units are arranged and configured in a single execution slice, and each execution slice has a plurality of STF blocks; one or more computer readable storage media; and programming instructions stored on the one or more computer readable storage media for execution by the at least one processor. The programming instructions when executed by the processor in one or more embodiments cause the processor to: read data from the STF register entries in the STF blocks; and write data from each of the plurality of execution units in the single execution slice to only one STF block where each of the execution units in the single execution slice writes data to a different STF block.

A method of processing data in a system having a processor is also disclosed, the processor having a register file, the register file being sliced into a plurality of STF blocks having a plurality of STF entries for storing data, wherein each STF block has different STF entries than the other STF blocks, each STF block having one or more write ports to write data to that STF block and multiple read ports to read data from that STF block, and a plurality of execution units associated with the register file wherein the plurality of execution units are arranged and configured in at least one execution slice, and each execution slice has a plurality of STF blocks, the method including writing data, in each execution slice, from one of the plurality of execution units to only one of the STF blocks in hat execution slice. According to an embodiment, each STF block is further partitioned into a plurality of sub-blocks, and the method in an aspect further comprises writing data from each execution unit to only one sub-block of STF entries, and writing data from each execution unit to a different sub-block of STF entries.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of the computer system, computer architectural structure, processors, register files, and/or their method of operation will be better understood when read in conjunction with the figures provided. Embodiments are provided in the figures for the purpose of illustrating aspects, features, and/or various embodiments of the computer system, computer architectural structure, processors, register files, and their method of operation, but the claims should not be limited to the precise system, assembly, subassembly, arrangement, structures, features, aspects, embodiments, and/or devices shown, and the systems, assemblies, subassemblies, arrangements, structures, features, aspects, embodiments, methods, processes, and/or devices shown may be used singularly or in combination with other systems, assemblies, subassemblies, arrangements, structures, features, aspects, embodiments, methods and/or devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, and their method of operation, however, it will be understood by those skilled in the art that different and numerous embodiments of the computer system, computer architectural structure, processor, register files, and their method of operation may be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of registers. It may be noted that a numbered element is numbered according to the figure in which the element is introduced, and is typically referred to by that number throughout succeeding figures.

Figure 1:
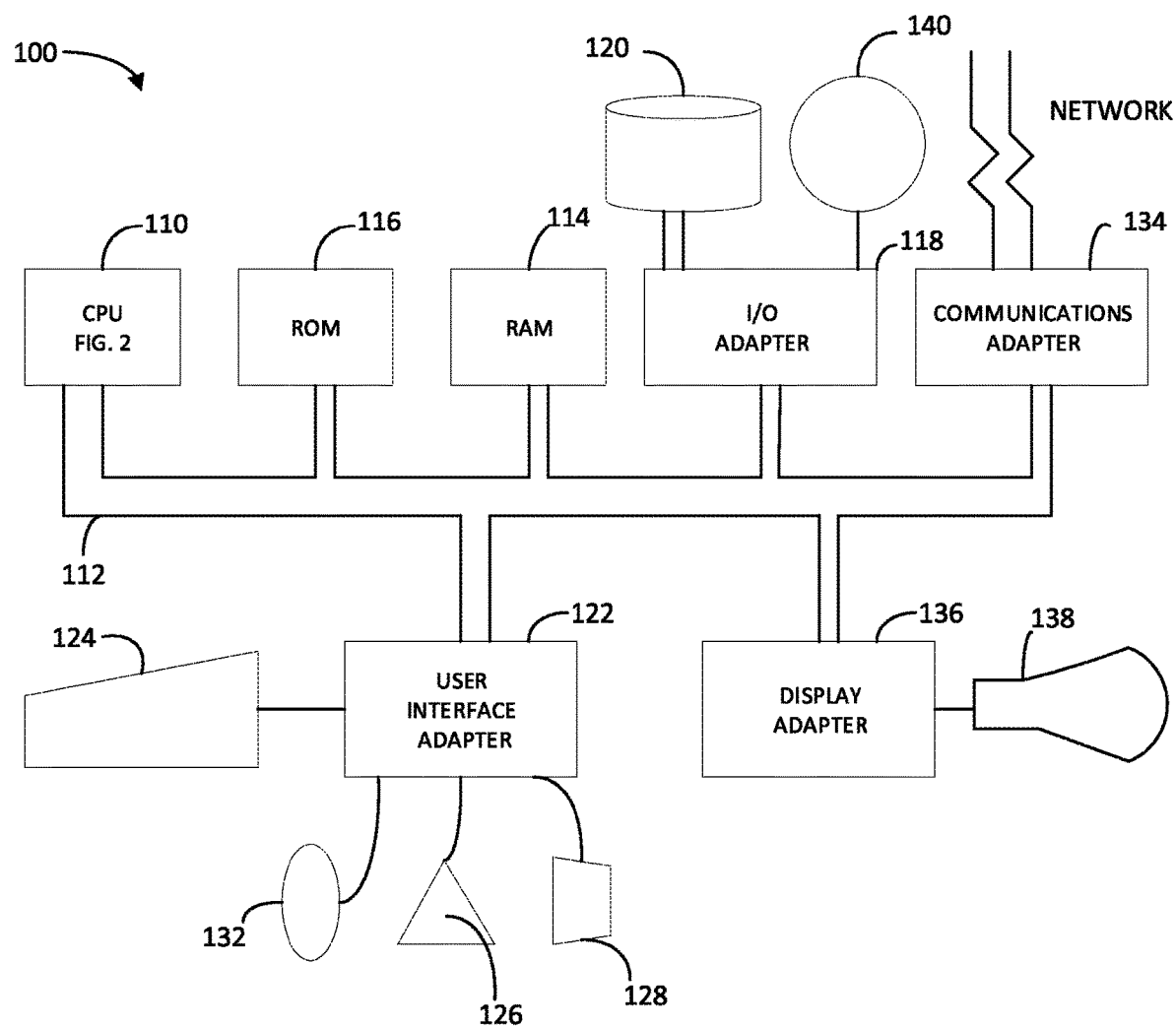
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
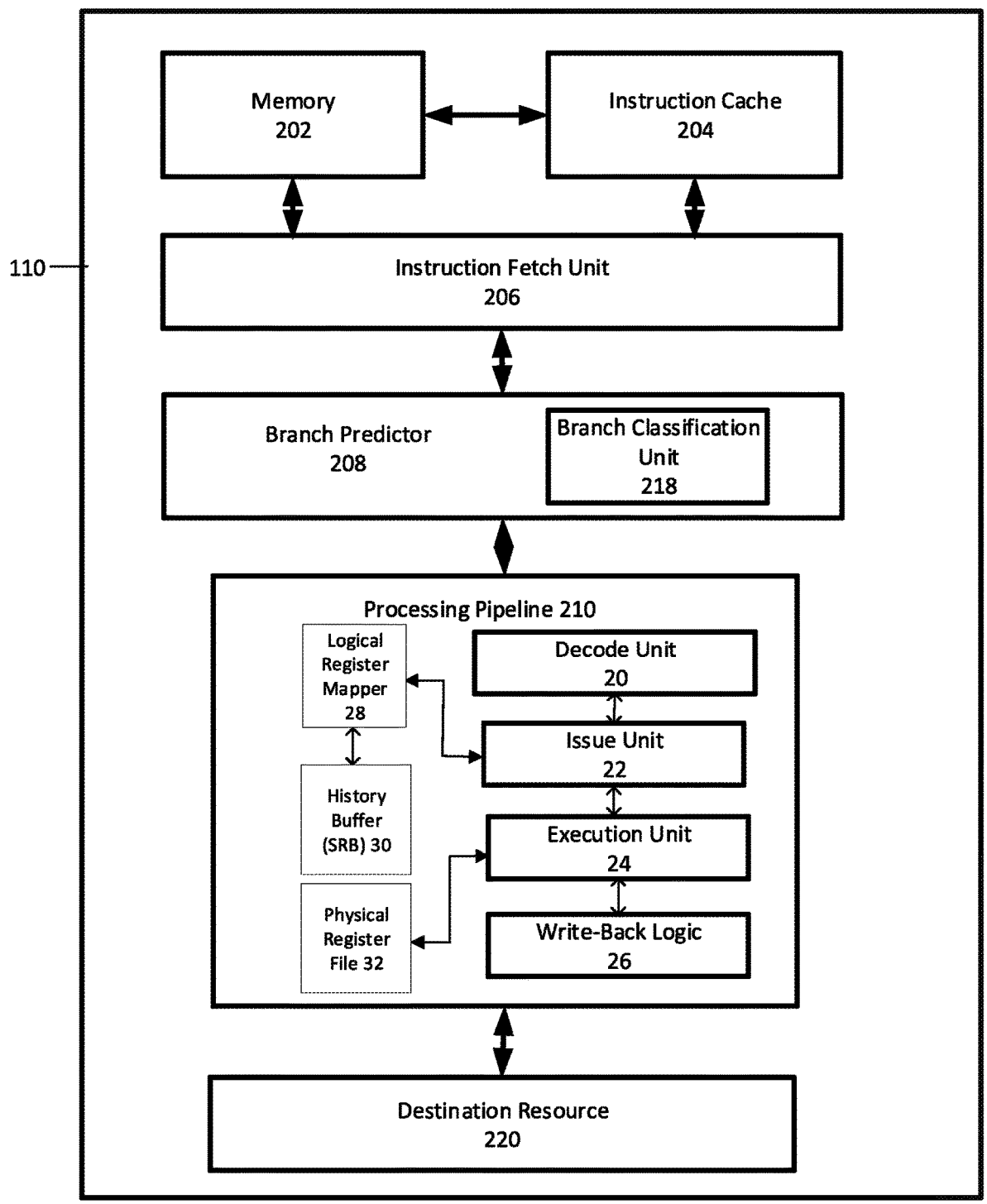
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units, vector scaler execution units, and/or other execution units. The logical register mapper 28 contains entries which provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer stores information from the logical register mapper 28 when a new instruction evicts data in case the new instruction is flushed and the old data needs to be recovered. The history (SRB) 30 buffer keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
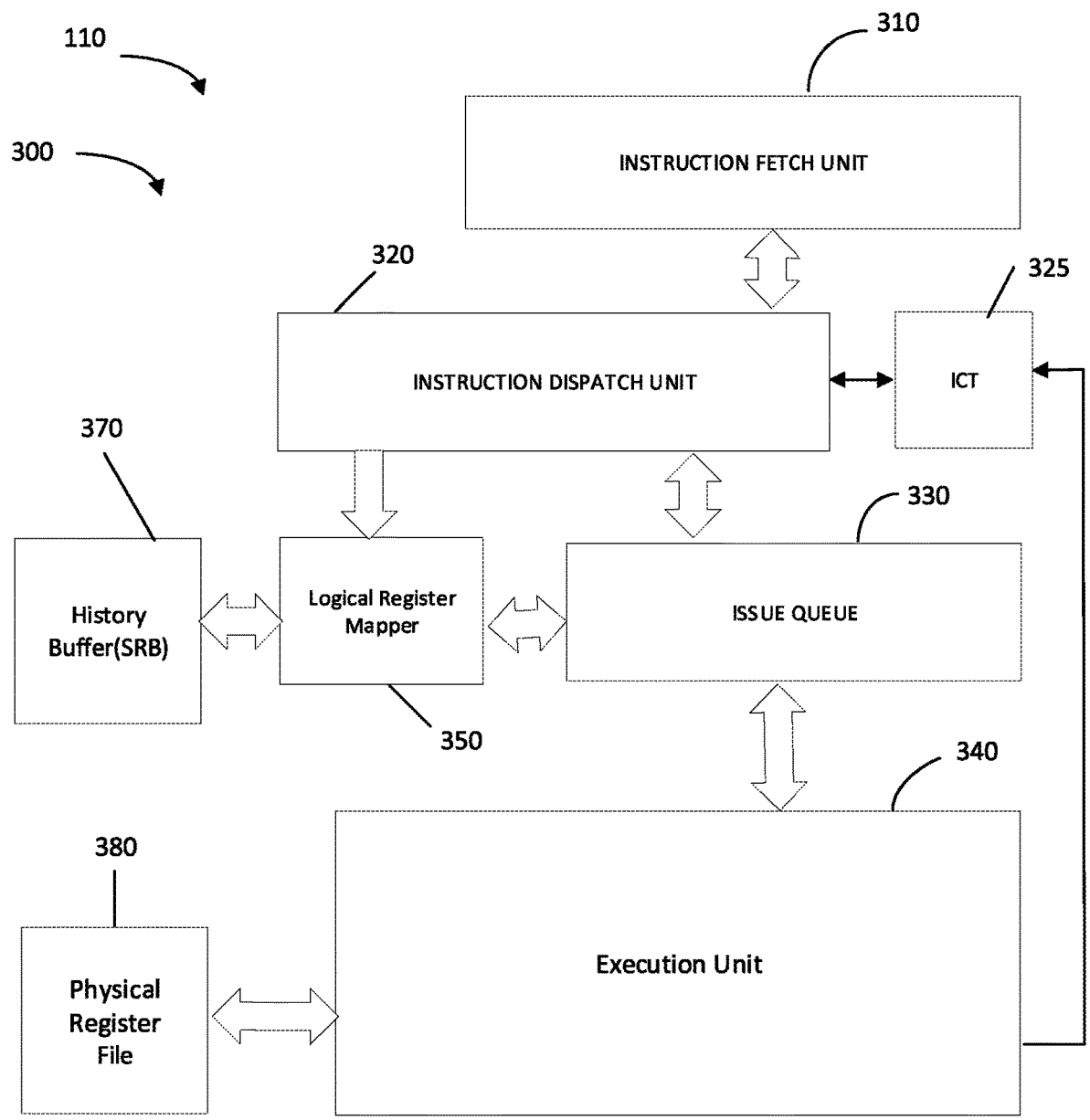
FIG. 3 illustrates a block diagram of a portion of a processor in accordance with an aspect of the present invention.

FIG. 3 illustrates a block diagram of a portion of a processor 110. The pipeline 300 in the processor 110 in FIG. 3 includes Instruction Fetch Unit 310, Instruction Dispatch Unit 320, Issue Queue (ISQ) 330, Instruction Completion Table (ICT) 325, Execution Unit 340, Logical Register Mapper 350, history buffer (SRB) 370, and Physical Register File 380. The Execution Unit 340 may include one or more queues to hold instructions for execution by the Execution Unit 340.

The Instruction Fetch Unit 310 fetches instructions to be executed by the processor 110 or processor slice and sends them to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out of order so instructions where the required data is available can be executed. Dispatch Unit 320 will stamp each instruction dispatched to the Issue Queue 330 with an identifier, e.g., identification tag (itag), to identify the instruction. The Dispatch Unit 320 may stamp instructions with other information and meta data. The instructions (itags) typically are allocated (assigned) and stamped in ascending program order on a per thread basis by the Dispatch Unit 320. Dispatch Unit 320 may also maintain a per thread instruction counter that increments for each instruction in a thread that is dispatched to the Issue Queue 330.

The Execution Unit 340 executes instructions out-of-order and when the Execution Unit 340 finishes an instruction, the Execution Unit 340 will send the finished instruction, e.g., itag, to the ICT 325. The ICT 325 contains a queue of the instructions dispatched by the Dispatch Unit 320 and tracks the progress of the instructions as they are processed. In an embodiment, the ICT 325 has a completion tail pointer that keeps track of the progress of executing instructions in the thread, e.g., points to the next to complete instruction. The instruction entry in the ICT will not identify the instruction as complete until all older instructions in the thread are completed.

History buffer (SRB) 370 contains logical register entries the logical register mapper 350 evicted from the logical register mapper 350 by younger instructions. The information stored in the history buffer (SRB) 370 may include the itag of the instruction that evicted the logical register entry (i.e., the evictor itag) from the logical register. History buffer (SRB) 370, in an embodiment, stores itag, logical register entry number (the bit field that identifies the logical register entry (LReg)), and Register File tag (RFTag) information. The RFTag is a pointer that correlates an entry in a logical register to an entry in the Physical Register File 380. History buffer (SRB) 370 may store and track other information. History buffer (SRB) 370 has an interface to the logical register mapper 350 to recover the itag, and register file tag (RFTag) (and other meta data) for each evicted logical register entry (LReg). The information is kept in the history buffer (SRB) 370 in a history buffer (SRB) entry until the new instruction (evictor instruction) is completed. At which point there is no reason to keep the old entry in the history buffer, e.g., SRB 370, and the entry is removed from the history buffer, as there is no flush recovery that could cause the history buffer (SRB) entry to be recovered Logical register mapper 350 contains meta data (e.g., itag, RFtag, etc.) which provides a mapping between entries in the logical register (e.g., GPR1) and entries in physical register file 380 (e.g., physical register array entry). The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry.

In certain aspects, a CPU 110 may have multiple execution/processing slices or pipelines with each slice having one or more of the units shown in FIG. 3. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple slices may considerably increase processing speed of the multi-slice processor. In single-thread (ST) mode a single thread is processed, and in SMT mode, two threads (SMT2) or four threads (SMT4) are simultaneously processed.

Figure 4:
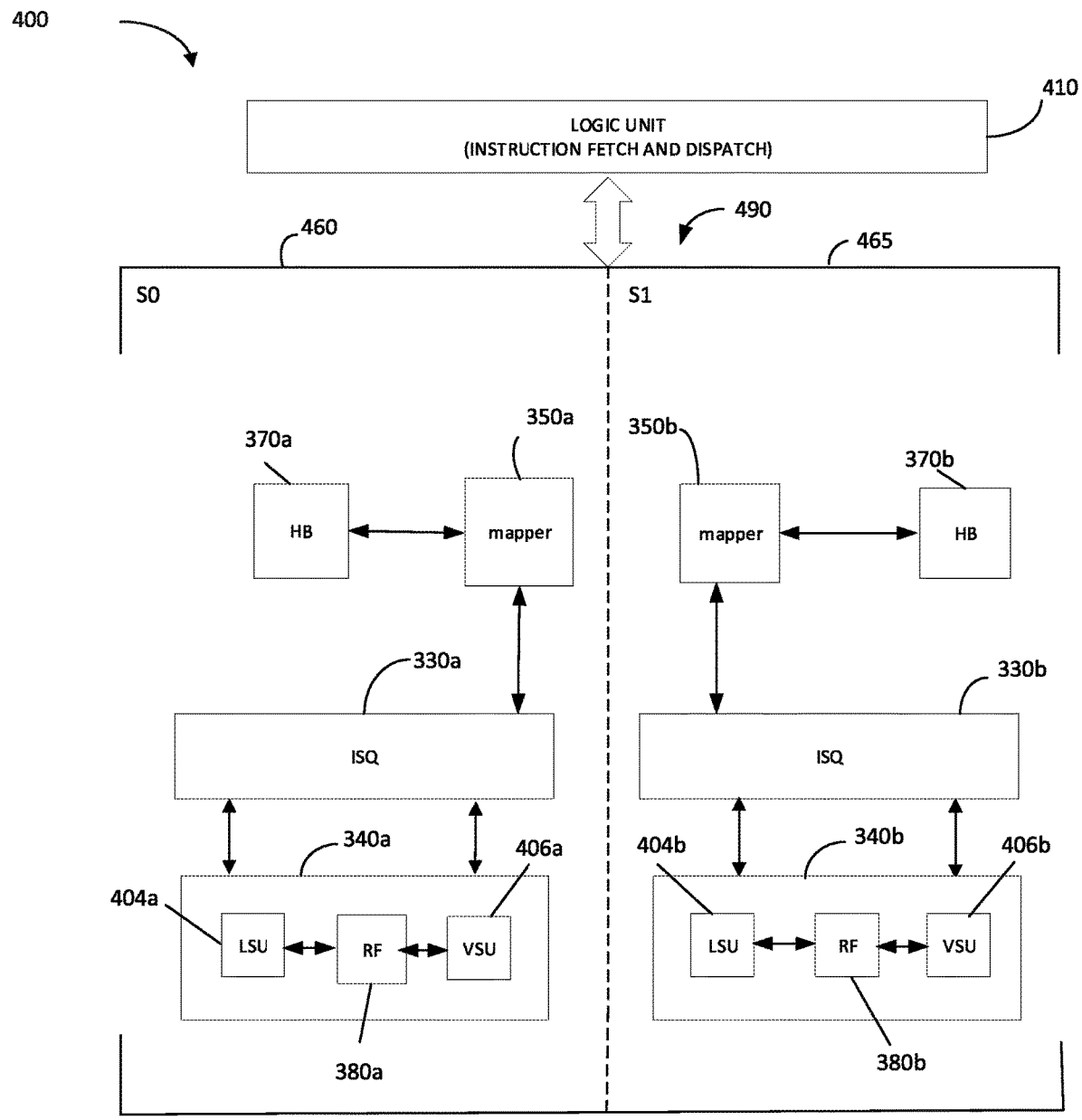
FIG. 4 illustrates a multi-slice processor in accordance with certain aspects of the present disclosure.

FIG. 4 illustrates a diagram of a multi-slice processor 400 in accordance with an embodiment of the present disclosure. It may be noted that FIG. 4 only shows portions of the multi-slice processor 400 in diagrammatic fashion for purpose of discussion. It will be appreciated that the multi-slice processor may have other configurations. As shown in FIG. 4, the multi-slice processor 400 includes two processing slices-Slice 0 (slice S0 or 460) and Slice 1 (slice S1 or 465). Each of the slices S0 and S1 includes an issue queue (ISQ) (330a and 330b), execution units (340a and 340b) that include a load store unit (LSU) (404a and 404b) and a vector scalar unit (VSU) (406a and 406b), a register file (RF) (380a and 380b), a history buffer (HB) (370a and 370b), and a mapper (350a and 350b).

It may be noted that the two slices are shown for ease of illustration and discussion only, and that multi-slice processor 400 may include more than two processing or execution slices with each slice having all the components discussed above for each of the slices S0 and S1 (slices 460 and 465). Further, the processing slices may be grouped into super slices (SS 490), with each super slice including a pair of processing slices. For example, a multi-slice processor may include two super slices SS0 and SS1, with SS0 including slices S0 and S1, and SS1 (not shown) including slices S2 and S3. In an aspect, each execution/processing slice may have its own register file as shown in FIG. 4. In another aspect, one register file may be allocated per super slice and shared by the processing slices of the super slice. In one aspect, one register file may be allocated to more than one super slice and shared by the processing slices of the super slices. For example, slices S0, S1, S2, and S3 may be allocated to share one register file.

As shown, logic unit 410 may perform instruction fetch and dispatch for the multi-slice processor. In certain aspects, the ISQ 330 holds a set of instructions and the register file 380 accumulates data for the instruction inputs. A register file may be used for staging data between memory and other functional (execution) units in the processor. There may be numerous register files and types. When all source data accumulates for the instruction, the data is passed on to one or more execution units designated for execution of the instruction. Each of the LSUs 404 and VSUs 406 may make result data available on the write back buses for writing into a register file (RF) entry. The register files will be discussed in more detail below.

In processors, a register file may be written to by all the execution units. All execution units, for example, all LSUs and VSUs, may be required to write their results to a register file. Increasing the number of execution units would require a increasing number of write ports to the register file. More write ports can increase the size and power consumption of a register file. In an embodiment, to reduce the number of write ports to a register file, and thus reduce power consumption and area used on the processor chip for the register file, each execution unit in an execution slice is assigned to write to only a portion of a register file. This is referred to as slice-target register file (STF). Assigning each execution unit in an execution slice to write to a portion, block, bank, or slice of a register file has scalability. For example, in an embodiment, for each execution unit added to an execution slice, another block of slice-target register file (STF) can be added to the register file without significantly increasing the overhead (area used) on the processor chip.

In certain aspects, each register file (or GPR array) may include a number of register file (RF) entries or storage locations (e.g., 90, 160, 320, or 640 RF entries). The register file (RF) may contain more or less RF entries. In an aspect, the RF entry may store bit data and/or control bits. In an aspect, the RF entries can be 64 or 72 bits wide. Other bit widths are contemplated by the disclosure.

In a processor there may be one or more execution slices, and two execution slices can be grouped together to form a super slice, e.g., super slice 490. There may be more or less execution slices in a processor, e.g., four execution slices. In an embodiment, each execution slice may have two blocks or banks of register files, and thus a super-slice may have four (4) blocks/banks of register files. Each execution slice may have more or less blocks/banks of register files. In an embodiment, at dispatch time, a mapper will assign a block of the register file, preferably a slice target register file block (STF) of the register file, to each execution unit. For example, in an execution slice that contains one vector scalar unit (VSU) and one load store unit (LSU), there will be two register blocks/banks, e.g., two STF register blocks. In an embodiment, each execution unit in a slice may write to one block of the register file. In an aspect, for each additional execution unit added to the execution slice, another register block, preferably a STF register block, can be added to the register file and assigned to the additional execution unit.

Each block of the register file, preferably each STF register block, in one or more embodiments is further divided into one or more sub-blocks of RF entries. For example, each block, e.g., STF block, can be divided into four sub-blocks. Each execution unit in a slice can be assigned to write to only a portion, e.g., a sub-block, of the STF register file block. For example, each execution unit may write to a sub-bock of the STF register file block. A register file may have one or more read ports and one or more write ports. In an aspect, the register file is divided into blocks and sub-blocks of RF entries for each execution unit to write data, and each execution unit only writes to a portion, e.g., a sub-block, of the register file to reduce the number of write ports to the register file. By reducing the number of write ports, the overhead and power consumption of the register file can be reduced. In an embodiment, the RF entries are read at issue time and written at write-back (WB) time. A mapper may assign a block/sub-block of the register file to each execution unit at dispatch time. The RF entries in the register file may be indexed by a tag identifier assigned by the mapper. For a slice-target register file (STF), the mapper in an embodiment assigns an STF tag and the blocks are indexed by STF tag.

Figure 5:
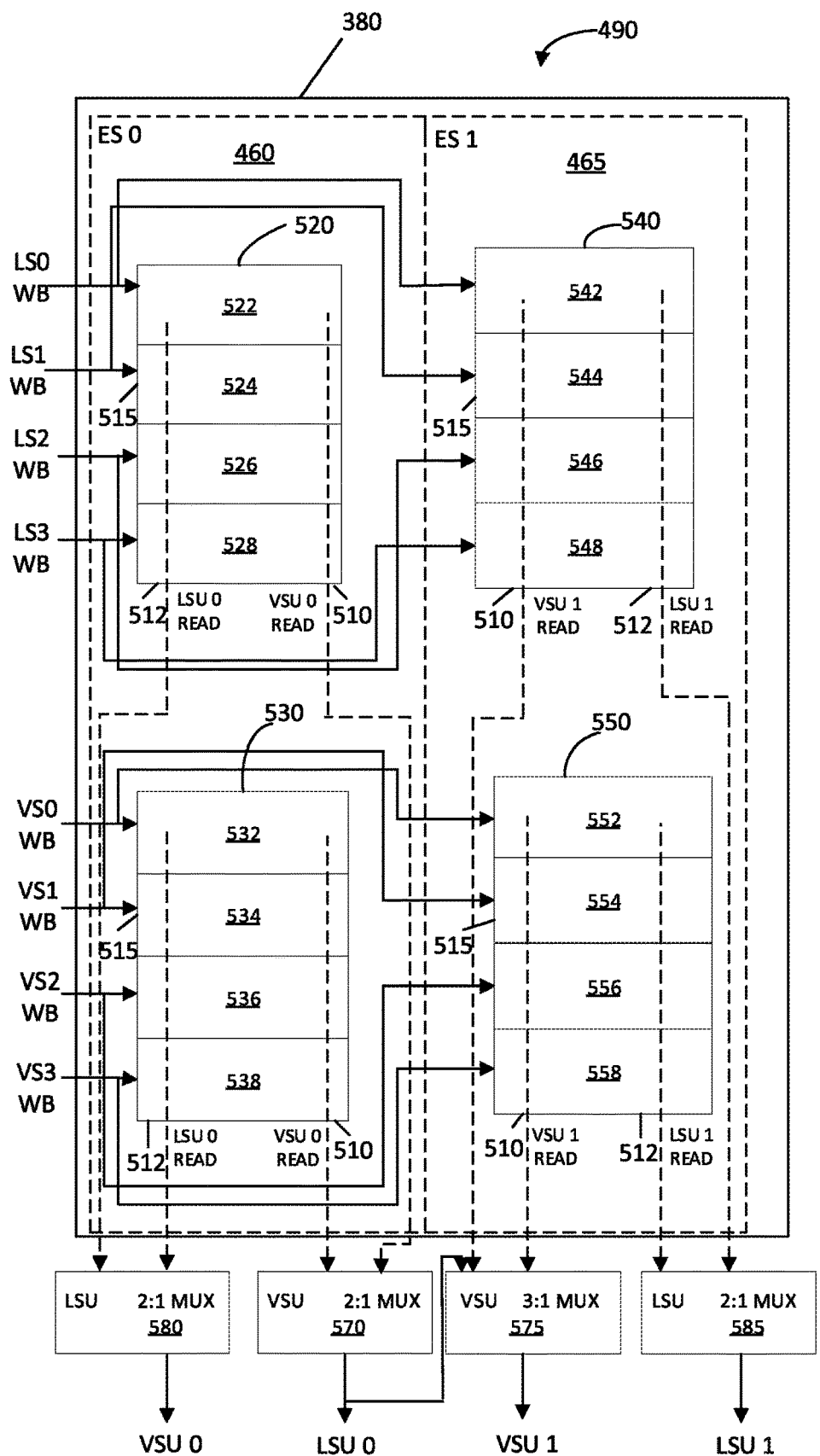
FIG. 5 illustrates an embodiment of a banked, sliced register file in accordance with an embodiment of the present disclosure.

FIG. 5 illustrates a diagram of exemplary register file 380 used in a super slice of a processor. The processor includes an execution slice 460 (ES 0) and an execution slice 465 (ES 1) which form a super slice 490. In the embodiment of FIG. 5, each execution slice 460 and 465 has a vector scalar unit (VSU 0 and VSU 1 not shown in FIG. 5) and a load store unit (LSU 0 and LSU 1 not shown in FIG. 5). In an aspect, each execution slice 460, 465 (ES 0 and ES 1) has a register file. Each register file has two blocks or banks of slice-target register files (STF) per execution slice. STF blocks 520 and 530 are used in slice 460 (ES 0) and STF blocks 540 and 550 are used in slice 465 (ES 1). In an embodiment, the register file is divided into two blocks of STF register files for each execution slice because there are two execution units (VSU and LSU) in each execution slice. It can be appreciated that the register files can be divided into a different number of blocks or banks, and that the number of banks or blocks do not have to equal the number of execution units. The number of blocks of register files in the execution slice in an embodiment can correspond or be equal to the number of execution units in the execution slice (ES).

In an embodiment, each STF block 520, 530, 540, 550 may have numerous register file (RF) entries. In the embodiment of FIG. 5, each STF block has 160 entries, with 320 entries per execution slice 350 and 360. In an aspect, each STF block or bank may have more or less RF entries. In a further aspect, each block 520, 530, 540, 550 may be further sub-divided into sub-blocks. In an embodiment, as shown in FIG. 5, each block 520, 530, 540, 550 may be further subdivided into four sub-blocks. For example, block 520 may be further divided into sub-blocks 522, 524, 526 and 528 as shown in FIG. 5. Each block may be divided into more or less sub-blocks. In the embodiment of FIG. 5, each block has 160 RF entries, and each sub-block is further divided into 40 RF entries. The number of RF entries in each of the sub-blocks may be the same or different.

In the embodiment of FIG. 5, each STF block or bank has five (5) read ports to support one LSU and one VSU. Each STF block can have more or less read ports. Each sub-block in FIG. 5 also supports five (5) read ports. The sub-blocks may be configured to support more or less read ports. In an embodiment, each STF block of the register file has three (3) read ports 510 for VSU reads and two (2) read ports 512 for LSU reads. More or less read ports may be provided, and/or the read ports may be configured in different arrangements.

In an embodiment, each STF block of the register file has one write port 515. An execution unit (e.g., LSU or VSU in FIG. 5) in one or more embodiments is assigned by the mapper to write to only a particular sub-block of a STF block. In the embodiment of FIG. 5, the LSU units write back to STF blocks 520 and 540, and in particular LSU 0 writes to sub-blocks 522 and 542, LSU 1 writes to sub-blocks 524 and 544, LSU 2 writes to sub-blocks 526 and 546, and LSU 3 writes to sub-blocks 528 and 548 (where LSU 2 and LSU 3 are from SS1 not shown). In an aspect, each LSU writes back to the sub-block it is assigned to through one write port 515. In the embodiment of FIG. 5, the VSU units write back to blocks 530 and 550, and in particular VSU 0 writes back to sub-blocks 532 and 552, VSU 1 writes back to sub-blocks 534 and 554, VSU 2 writes back to sub-blocks 536 and 556, and VSU 3 writes back to sub-blocks 538 and 558 (where VSU 2 and VSU 3 are from SS1 not shown). In each aspect, a VSU writes back to the sub-block it is assigned to through one write port 515. Both VSU and LSU write back to one of the STF blocks of the STF register file through one write port, but write to different blocks of the register file, e.g., LSU writes to blocks 520 and 540, while VSU writes to blocks 530 and 550. By reducing the number of write ports, and in an exemplary embodiment using only one write port, to write to each STF block of the register file, less space is used on the processor chip and less power is consumed by the register file 380.

When reading from a register file, the data from the STF blocks in the first execution slice (ES 0) are feed to a multiplexor and the output of the multiplexor is feed to the execution units in the first execution slice (ES 0). Similarly, the data from the STF blocks in the second execution slice (ES 1) are feed to a multiplexor and the output of the multiplexor is fed to the execution units in the second execution slice (ES 1). For example, in FIG. 5, data read from blocks 520 and 530 are feed to 2:1 multiplexor 570, and the output of multiplexor 570 is feed to an execution unit (VSU 0) in execution slice 450 (ES 0), and data read from blocks 540 and 550 are feed to 3:1 multiplexor 575 and the output of multiplexor 575 is feed to an execution unit (VSU 1) in execution slice 360 (ES 1). In FIG. 5, three read ports 510 in each STF block permit up to three operands to be fed to the multiplexors 570 and 575, and the multiplexor 570 and 575 selects which block, e.g., 520 or 530 and 540 or 550, the up to three operands are selected from and input to VSU 0 and VSU 1. In FIG. 5, the output from multiplexor 570, e.g., the up to three operands, is fed as one of the three sets of inputs fed into the multiplexor 575 so data that resides in execution slice 460 can be fed to the VSU in execution slice 465 (ES1). Multiplexor 570 is for situations where the data between slices 460/465 and/or blocks (banks) 530/550 are not the same but needs to be accessed as explained below.

In addition, in FIG. 5, data read from blocks 520 and 530 are feed to 2:1 multiplexor 580, and the output of multiplexor 580 is feed to LSU (LSU 0) in execution slice 450 (ES 0), and the data read from blocks 540 and 550 are feed to 2:1 multiplexor 585 and the output of multiplexor 585 is feed to LSU (LSU 1) in execution slice 350 (ES 1). In FIG. 5, two read ports 512 in each STF bank permit up to two operands to be fed to the multiplexors 580 and 585, and the multiplexors select which bank, e.g., 520 or 530 and 540 or 550, the operands for the LSU are received from.

In the embodiment of FIG. 5, the width of each block 520, 530, 540, and 550 is sixty-four (64) bits (or seventy two (72) bits with ECC). Where 64 (or 72) bit data is processed from each execution slice, a first thread can be processed in execution slice 460 (ES)) and a different thread can be processed in execution slice 465 (ES1).

In an embodiment, 128 bit reads and writes of the register file can be accommodated, which will span across a super slice, e.g. super slice 490, e.g., across two STF register blocks. For example, in situations a sixty-four (64) bit VSU instruction may need to read a 128 bit operation. In addition, the instruction may be processed on or directed to the odd-slice, e.g., ES 1, slice 465. In an embodiment, for the VSU instruction sitting or being processed on an odd slice, where the instruction reads a 128 bit operation, the issue queue (ISQ) will utilize an issue cycle from the even slice, e.g., ES 0, slice 460. One manner of accomplishing the 128 bit read operation is by muxing the STF data field of the odd slice (e.g., slice 465) and the STF data fields of the even slice (e.g., slice 460) at issue time. The even slice's STF data will be added to the odd slice's STF data, and the instruction issued from the even slice, e.g., slice 460, will be cancelled to give the issue slot to the odd slice, e.g., slice 465. In an embodiment, as shown in FIG. 5, a third input, i.e., the output of the multiplexor 570, is also feed into multiplexor 575 as an input. The purpose of feeding the output of multiplexor 570 as an input to multiplexor 575 is for situations where a 64-bit instruction needs to read a 128-bit operation. For example, in FIG. 5, the output from the multiplexor 570 will be wired as an input to the 3:1 multiplexor 575, while the output of the multiplexor 570 to VSU 0 will be cancelled. The output of the 3:1 multiplexor 575 will select the even slices' 64 bit data which will be transmitted to VSU 1 in the odd slice 465. The 64 bit data from the even slice can be processed with the 64 bit data of the odd slice.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer system for processing information, the computer system comprising:
at least one processor;
a register file associated with the at least one processor, the register file sliced into a plurality of STF blocks having a plurality of STF entries, wherein each STF block has one or more write ports for writing data to that STF block and a plurality of read ports for reading data from that STF block, and wherein each STF block is further partitioned into a plurality of sub-blocks, each sub-block having a different portion of the plurality of STF entries for storing data; and
a plurality of execution units associated with the register file and configured to read data from and write data to the register file, where the plurality of execution units are arranged and configured in an execution slice, and the execution slice has a plurality of STF blocks,
wherein the system is configured so that each of the plurality of execution units in the execution slice is assigned to write to only one of the plurality of STF blocks.

2. The computer system according to claim 1, wherein each of the plurality of execution units in the execution slice is assigned to write data to only one of the plurality of sub-blocks of one of the plurality of STF blocks of the register file.

3. The computer system according to claim 2, further comprising a mapper for mapping logical register entries to one sub-block of the plurality of sub-blocks based upon the execution unit.

4. The computer system according to claim 1, wherein the plurality of execution units per execution slice comprises at least two execution units, wherein the register file comprises at least two STF blocks of STF entries, and each execution unit writes to a different STF block.

5. The computer system according to claim 4, wherein the execution units in at least one execution slice includes a vector scalar unit (VSU) and a load store unit (LSU) with the VSU writing to a different STF block than the LSU.

6. The computer system according to claim 1, wherein each STF block is configured to have two or less write ports.

7. The computer system according to claim 1, wherein each STF block is configured to have only one write port.

8. The computer system according to claim 1, wherein at least one STF block has four or more sub-blocks and only a single write port.

9. The computer system according to claim 1, wherein the processor further comprises a plurality of read multiplexors per execution slice wherein the read multiplexors receive data from the plurality of STF blocks in its execution slice.

10. The computer system according to claim 9, wherein there are at least two read multiplexors per execution slice and the first read multiplexor receives up to three operands from the plurality of STF blocks of the register file in its execution slice and outputs up to three operands to a vector scalar unit (VSU) and the second read multiplexor receives up to two operands from the plurality of STF blocks of the register file in its execution slice and outputs up to two operands to a load store unit (LSU).

11. The computer system according to claim 1, wherein the processor has at least two execution slices and a first execution slice and a second execution slice are arranged and configured as a super slice, wherein the first execution slice has at least two STF blocks and the second execution slice has at least two copies of the STF blocks from the first execution slice, and wherein the number of STF blocks per execution slice is equal (corresponds) to the number of execution units in that execution slice.

12. The computer system according to claim 11, wherein the first execution slice has a plurality of multiplexors equal in number to the number of execution units in the first execution slice and the second execution slice has a plurality of multiplexors equal in number to the number of execution units in the second execution slice, and the output from each of the multiplexors in each of the first and second execution slices is configured to be received by the execution units in the respective execution slice.

13. The computer system according to claim 12, wherein the first execution slice has a first multiplexor to receive up to three operands read from the plurality of STF blocks in the first execution slice and has a second multiplexor to receive up to two operands read from the plurality of STF blocks in the first execution slice, and the second execution slice has a first multiplexor to receive up to three operands read from the plurality of STF blocks in the second execution slice and has a second multiplexor to receive up to two operands read from the plurality of STF blocks in the second execution slice, and wherein the output of the first multiplexor in the first execution slice is configured as one of the inputs to the first multiplexor of the second execution slice.

14. The computer system according to claim 13, wherein the STF entries are "N" bits or less in width, and the processor is configured and adapted to handle operations greater than "N" bits by muxing the STF entry from the first execution slice onto the STF entry from the second execution slice.

15. The computer system according to claim 1, wherein the processor comprises four execution slices having a first super slice that includes first and second execution slices and a second super slice that includes third and fourth execution slices, wherein each execution slice has at least two STF blocks and at least two execution units, the STF blocks of the second, third and fourth executions slices being copies of the STF blocks of the first execution slice, and wherein each STF block is further partitioned into a plurality of sub-blocks where the number of sub-blocks is equal to the number of execution slices.

16. The computer system of claim 15, wherein each execution slice includes two execution units and two STF blocks where each STF block has four (4) sub-blocks of STF entries.

17. A computer system for processing information, the computer system comprising:
at least one processor; and
a register file associated with the at least one processor, the register file having a plurality of STF blocks having a plurality of STF entries for storing data, wherein each STF block has one or more write ports to write data to the STF block and multiple ports to read data from the STF block, and wherein each STF block is further partitioned into a plurality of sub-blocks, each sub-block having a different portion of the plurality of STF entries for storing data; and
a plurality of execution units associated with the register file wherein the plurality of execution units are arranged and configured in a single execution slice, and each execution slice has a plurality of STF blocks;
one or more computer readable non-transitory storage media; and
programming instructions stored on the one or more computer readable non-transitory storage media for execution by the at least one processor,
wherein the programming instructions when executed by the processor cause the processor to:
read data from the STF register entries in the STF blocks; and
write data from each of the plurality of execution units in the single execution slice to only one STF block where each of the execution units in the single execution slice writes data to a different STF block.

18. The computer system according to claim 17, wherein the processor comprises four execution slices having a first super slice that includes first and second execution slices and a second super slice that includes third and fourth execution slices, wherein each execution slice has at least two execution units, and the first execution slice has at least two STF blocks and the number of execution units in each execution slice is equal to the number of STF blocks in that execution slice, the STF blocks of the second, third and fourth executions slices being copies of the at least two STF blocks of the first execution slice, and wherein each STF block is further partitioned into a plurality of sub-blocks where the number of sub-blocks in each STF block is equal to the number of execution slices,
wherein the programming instructions when executed by the processor cause the processor to:

write data from each execution unit in the four execution slices to only one sub-block of STF entries wherein each execution unit writes data to a different sub-block of STF entries.

19. A method of processing data in a system having a processor, the processor having a register file, the register file being sliced into a plurality of STF blocks having a plurality of STF entries for storing data, wherein each STF block has different STF entries than the other STF blocks, each STF block having one or more write ports to write data to that STF block and multiple read ports to read data from that STF block, and a plurality of execution units associated with the register file wherein the plurality of execution units are arranged and configured in at least one execution slice, and each execution slice has a plurality of STF blocks, the method comprising:

writing data, in each execution slice, from one of the plurality of execution units to only one of the STF blocks in hat execution slice.

20. The method according to claim 19, wherein each STF block is further partitioned into a plurality of sub-blocks, and the method further comprises writing data from each execution unit to only one sub-block of STF entries, and writing data from each execution unit to a different sub-block of STF entries.

* * * * *